(12) United States Patent
Gorges et al.

(10) Patent No.: US 10,982,714 B2
(45) Date of Patent: Apr. 20, 2021

(54) PLAIN BEARING AND METHOD

(71) Applicants: Mahle International GmbH, Stuttgart (DE); Mahle Engine Systems UK Ltd, Rugby (GB); MAHLE GmbH, Stuttgart (DE)

(72) Inventors: Roger Gorges, Birmingham (GB); John Carey, Northamptonshire (GB); Anil Rathod, Nuneaton (GB); Stephan Koerner, Besigheim (DE)

(73) Assignees: Mahle International GmbH; Mahle Engine Systems UK Limited; Mahle GmbH

(*) Notice: Subject to any disclaimer, the term of this patent is extended or adjusted under 35 U.S.C. 154(b) by 0 days.

(21) Appl. No.: 15/573,780

(22) PCT Filed: May 11, 2016

(86) PCT No.: PCT/EP2016/060570
§ 371 (c)(1),
(2) Date: Nov. 13, 2017

(87) PCT Pub. No.: WO2016/180884
PCT Pub. Date: Nov. 17, 2016

(65) Prior Publication Data
US 2018/0149196 A1    May 31, 2018

(30) Foreign Application Priority Data

May 14, 2015  (GB) ..................... 1508258

(51) Int. Cl.
*F16C 33/12* (2006.01)

(52) U.S. Cl.
CPC ........ *F16C 33/127* (2013.01); *F16C 2223/70* (2013.01)

(58) Field of Classification Search
CPC .... F16C 17/02; F16C 33/121; F16C 2204/20; F16C 2204/52; F16C 33/127;
(Continued)

(56) References Cited

U.S. PATENT DOCUMENTS

| 7,229,699 B2 * | 6/2007 | Toth ........................ C23C 4/02 |
| | | 29/898.12 |
| 7,541,086 B2 * | 6/2009 | Gartner ................ F16C 33/201 |
| | | 384/276 |

(Continued)

FOREIGN PATENT DOCUMENTS

| CN | 100532872C C | 8/2009 |
| CN | 103080381 A | 5/2013 |

(Continued)

OTHER PUBLICATIONS

English abstract for DE-102010018328.
(Continued)

*Primary Examiner* — Daniel J. Schleis
*Assistant Examiner* — Kevin C T Li
(74) *Attorney, Agent, or Firm* — Fishman Stewart PLLC

(57) ABSTRACT

A plain bearing may comprise a bearing substrate, a bearing overlay, and an interlayer disposed between the bearing substrate and the bearing overlay. The interlayer may comprise hexagonal boron nitride.

18 Claims, 2 Drawing Sheets

(58) Field of Classification Search
CPC ... F16C 2223/70; B23K 20/26; B23K 20/002; B23K 2103/10; B23K 2103/04
See application file for complete search history.

(56) References Cited

U.S. PATENT DOCUMENTS

| | | | | |
|---|---|---|---|---|
| 2006/0120645 | A1* | 6/2006 | Toth | C23C 4/02 384/288 |
| 2010/0190667 | A1 | 7/2010 | Schmitt et al. | |
| 2013/0330572 | A1* | 12/2013 | Staschko | C23C 28/02 428/647 |

FOREIGN PATENT DOCUMENTS

| | | |
|---|---|---|
| CN | 203051498 U | 7/2013 |
| DE | 102009019601 B3 | 5/2010 |
| DE | 102008060765 A1 | 6/2010 |
| DE | 102010018328 A1 | 10/2011 |
| DE | 102011013881 B3 | 5/2012 |
| EP | 1640626 A1 | 3/2006 |
| JP | S54-71730 A | 6/1979 |
| JP | S56-75598 A | 6/1981 |
| JP | S62-86198 A | 4/1987 |
| JP | 2013204810 A | 10/2013 |
| JP | 2014500394 A | 1/2014 |
| WO | WO-2012119822 A2 * | 9/2012 ............ C22C 19/00 |

OTHER PUBLICATIONS

English abstract for DE-102011013881.
English abstract for DE-102008060765.
English abstract for DE-102009019601.
English abstract for CN-203051498.
Chinese Office Action dated Nov. 28, 2019 related to corresponding Chinese Patent Application No. 201680024987.8.
Japanese Office Action dated Dec. 24, 2019 related to corresponding Japanese Patent Application No. 2017-556852.
Japanese Office Action dated Aug. 18, 2020 related to Japanese Patent Application No. 2017-556852.
European Office Action dated Nov. 11, 2020 related to corresponding European Patent Application No. 16723331.1.

* cited by examiner

PLAIN BEARING AND METHOD

CROSS-REFERENCE TO RELATED APPLICATIONS

This application claims priority to International Patent Application PCT/EP2016/060570 filed on May 11, 2016, which also claims priority to United Kingdom Patent Application GB 1508258.9 filed on May 14, 2015, the contents both of which are hereby incorporated by reference in their entirety.

TECHNICAL FIELD

The present invention relates to a plain bearing and a method for fabricating a plain bearing.

BACKGROUND

Plain bearings are used in many applications, such as for crankshaft journal bearings in internal-combustion engines. Plain bearings are usually in the form of two semi-cylindrical bearing shells and generally have a layered construction. The layered construction frequently comprises; a backing made from a strong backing material such as steel, of a thickness in the region of about 1 mm or more; a lining of a first bearing material adhered to the backing and of a thickness generally in the range from about 0.1 to 0.5 mm; and an overlay (or sliding layer or running layer) supported by the lining and having a thickness of less than about 40 µm. The surface of the overlay forms the running or sliding surface with a cooperating shaft journal surface.

The backing provides strength and resistance to deformation of the bearing shell when it is installed in a main-bearing housing or in a connecting-rod big end, for example.

A purpose of the bearing lining is to provide suitable bearing running properties in case the overlay should be worn through for any reason, and to prevent the journal surface from coming into contact with the strong backing material. The lining may commonly be either an aluminium-based alloy or a copper alloy. Copper alloys, such as bronzes or brasses, are typically used in more highly-loaded bearings to provide additional support for the overlay.

The overlay is conventionally formed by a relatively soft metal layer, such as lead or a lead-tin alloy. A relatively soft overlay is used in order to provide conformability (the ability of the bearing to accommodate small misalignments between the bearing surface and the shaft journal) and embeddability (the ability to prevent debris or dirt particles, which may circulate in the lubricating oil, from scoring or damaging the journal surface by enabling such debris to embed in the bearing surface).

Many conventional overlay materials are based on alloys of lead. Lead is a toxic metal and its use in internal-combustion engines is undesirable, and its use is being discouraged by governmental legislation throughout the world.

Lead-free overlay materials are available, typically based on tin or bismuth alloys. However, when tin or bismuth is used in an overlay and is deposited on a bearing lining comprising a copper alloy, a problem arises in that the tin or bismuth, under the elevated temperatures of engine operating conditions, disadvantageously tends to diffuse out of the overlay into the lining alloy, and/or to form intermetallic compounds with the copper in the lining.

This problem is conventionally addressed by coating the lining surface with a nickel interlayer, of up to about 3 µm thickness, and then forming the overlay over the interlayer.

The nickel interlayer, which is sometimes referred to as a barrier layer or nickel dam, provides a diffusion barrier between the overlay and the lining. However, the use of a nickel interlayer leads to a new problem.

As described above, in a conventional bearing having a lead-based overlay, an important function of the lining is to provide suitable bearing running properties if the overlay should be worn through for any reason. But if an overlay is formed over a nickel interlayer, and the overlay is worn through during use to expose the nickel, the nickel does not provide suitable bearing running properties.

In practice, in a bearing comprising a lead overlay and a copper-based lining, if the overlay in a portion of the bearing is worn through to expose the lining, the bearing may continue to operate even though bearing performance is reduced. For example, bearing friction may rise, but the bearing may not seize, allowing time for the bearing to be replaced. (The wearing-through of the overlay and the exposure of the layer beneath is sometimes termed a scuffing event.)

By contrast, in a bearing comprising a lead-free overlay, a nickel interlayer and a copper-based lining, if the overlay wears through and the nickel is exposed, then rapid seizure of the bearing is much more likely. Seizure can cause extensive damage to, for example, an internal-combustion engine.

This is a particular problem in highly-loaded bearing applications, where designers and engineers specifying and using plain bearings prefer to use bearings with lead-based overlays, despite the problem of lead pollution and the long-felt need for alternative, lead-free bearings.

It is an object of the present invention to solve this problem.

SUMMARY

The invention provides a plain bearing and a method for fabricating a plain bearing as defined in the appended independent claims, to which reference should now be made. Preferred or advantageous features of the invention are set out in dependent subclaims.

In a preferred aspect, the invention may therefore provide a plain bearing comprising a bearing substrate, a bearing overlay, and an interlayer between the bearing substrate and the bearing overlay, the interlayer comprising hexagonal boron nitride (h-BN). The h-BN is preferably in the form of particles, for example embedded in or incorporated in the interlayer. The particles are preferably of a diameter less than the thickness of the interlayer, so that they are embedded within the thickness of the interlayer material (although a proportion of the particles may be at a surface of the interlayer). The interlayer preferably comprises nickel, for example electro-deposited nickel, incorporating the h-BN particles.

The interlayer is preferably of thickness greater 2 µm or 3 µm or 4 µm and/or less than 8 µm or 7 µm or 6 µm. Preferably the interlayer thickness is about 5 µm. The h-BN particles are preferably of diameter less than 6 µm or 5 µm or 3 µm or 2 µm or 1 µm, and/or greater than 0.1 µm or 0.2 µm.

The overlay is preferably a lead-free overlay. Suitable overlay materials may include, tin, tin alloys, bismuth and bismuth alloys. Suitable tin alloys may be tin-copper alloys, tin-zinc alloys and tin-nickel alloys. The overlay may incorporate hard particles, in known manner, to reduce wear, particularly if a soft overlay material is used. Suitable hard particles may include carbides, nitrides and oxides. A particularly-suitable material for the hard particles is boron carbide. Hard particles may be incorporated at between 0.5 and 5 wt %, for example.

The overlay thickness may be greater than 6 µm or 8 µm or 10 µm and/or less than 25 µm or 20 µm or 15 µm.

The inventors have carried out tests comparing bearings embodying the invention with bearings incorporating conventional nickel interlayers. The tests show that if an overlay wears through, the seizure load for a plain bearing embodying the invention is dramatically higher than the seizure load for a prior-art bearing incorporating a pure nickel interlayer. Alternatively, at a constant load, the lifetime of a bearing embodying the invention is greatly increased by comparison with a conventional bearing having a pure nickel interlayer. These test results indicate that bearings embodying the invention may advantageously enable lead-free overlay materials to be significantly more tolerant in the event of overlay failure or wear, for example giving an opportunity to replace a lead-free plain bearing before seizure causes more significant damage. The use of such lead-free overlay materials is highly desirable in the interests of reducing lead pollution.

In other words, plain bearings embodying the invention may be much more able to recover from scuffing events than conventional bearings incorporating pure nickel interlayers.

A further aspect of the invention may advantageously provide a method for forming a bearing interlayer comprising h-BN, the method comprising electrolytically depositing the interlayer from an electrolyte comprising particles of h-BN.

Advantageously, conventional electrolytes incorporating nickel salts such as $NiSO_4$ or $NiCl_2$ (a Watts nickel bath) may be used. To implement this aspect of the invention, h-BN particles may be mixed with the electrolyte, for example in the form of a suspension or dispersion.

A problem arises in that a very small particle size is desirable for incorporation into the bearing interlayer, in order to optimise bearing performance. The inventors have found, however, that if a wide distribution of h-BN particle sizes is dispersed in an electrolyte, then by controlling the electro-deposition process, only smaller h-BN particles from the electrolyte are incorporated into the interlayer. A high-performance interlayer embodying the invention may therefore be formed even if a source of h-BN particles includes undesirably large particle sizes.

BRIEF DESCRIPTION OF THE DRAWINGS

Embodiments of the invention will now be described by way of example, with reference to the accompanying drawings, in which.

DETAILED DESCRIPTION

Figure 1:
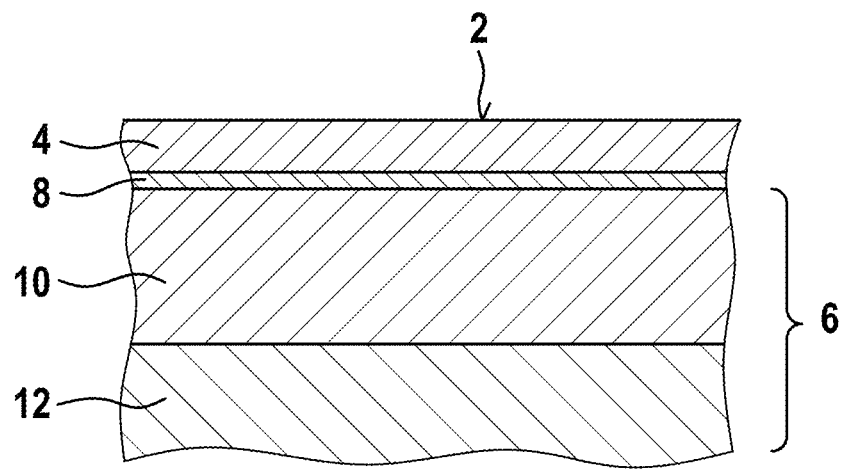
FIG. 1 is a cross section through a portion of a plain bearing embodying the present invention.

FIG. 1 is a schematic sectional view of a bearing embodying the invention, on a section plane perpendicular to a running surface 2 of the bearing. The running surface is formed from a bearing overlay 4 separated from a bearing substrate 6 by an interlayer 8. The substrate comprises a bearing lining 10 bonded to a bearing backing 12.

The backing may be in the form of a semi-cylindrical bearing shell, fabricated from steel. The lining is of bronze and conforms to the shape of the backing. The interlayer is of Ni incorporating h-BN particles and is formed over the interlayer by electro-deposition as described below. The overlay is of tin, optionally containing 0.5 to 5 wt % of hard particles.

Figure 2:
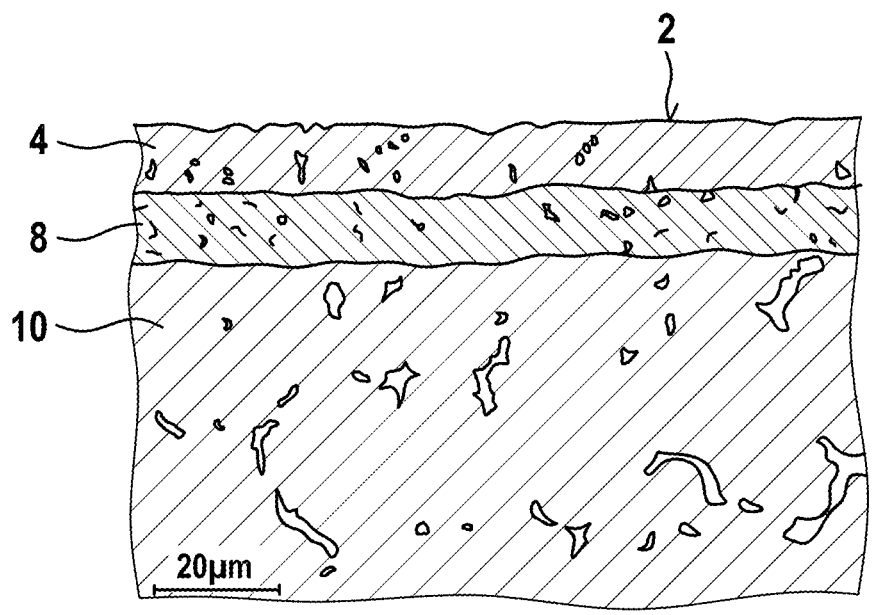
FIG. 2 is a metallurgical microsection of a bearing embodying the invention.

FIG. 2 is a metallurgical section of an embodiment of the invention, fabricated by the inventors for testing. In this embodiment, both the tin overlay 4 and the interlayer 8 are approximately 10 µm thick. The interlayer is bonded to the bronze lining 10. The bearing backing does not appear in this metallurgical section.

In a preferred embodiment, the interlayer thickness is between 3 and 7 µm and preferably about 5 µm. The interlayer shown in FIG. 2 is therefore a little thicker than would be preferred, but the thickness of the interlayer can be controlled as described further below.

In embodiments of the invention, the interlayer comprises nickel incorporating h-BN particles. The interlayer can be formed by electrolytic deposition from a suitable electrolyte. In one embodiment, the electrolyte comprises:

500 g/l $NiSO_4*7H_2O$;
50 g/l boric acid;
1 g/l saccharin;
5-30 g/l h-BN;
Dispersants; and
Surfactants The electrolyte has a pH of between 2 and 3 and a temperature of between 60 C and 70 C. Electrolytic deposition is carried out at a current density of 1-10 $A/dm^2$.

The h-BN is added to the electrolyte in a dispersion of powder of the following particle size range:

diameter 10%: 0.36 µm
diameter 50%: 1.65 µm
diameter 90%: 7.50 µm

In other words, 10% of the particles are of diameter 0.36 µm or less, 50% are of diameter 1.65 µm or less, and 90% are of diameter 7.50 µm or less.

The duration and current density of the electrolytic deposition is controlled to achieve a predetermined interlayer thickness on the bronze bearing lining.

As an alternative, a $NiCl_2$-based electrolyte may be used, in a Watts nickel bath, with the same h-BN powder, or particles, added to the electrolyte as in the $NiSO_4$ electrolyte described above.

In the microsection in FIG. 2, the presence of h-BN particles within the nickel-based interlayer can be seen. The sizes of the h-BN particles in the layer are typically 1 µm or less. The inventors have found that by controlling the electrolytic deposition process using the electro-deposition conditions described above, smaller particles of h-BN can be incorporated into the interlayer in preference to larger h-BN particles. The larger particles remain in the electrolyte. This enhances the performance of the interlayer and of the bearing.

In order to optimise the performance of the bearings, the inventors have carried out tests of different bearings embodying the invention. These experiments were carried out using a test rig in which a controlled load is applied to a plain bearing coupled to a rotating shaft. The load is applied perpendicular to the axis of rotation of the shaft, and the bearing is coupled to an eccentric portion of the shaft to generate dynamic loading. Oil is supplied to the plain bearing, in conventional manner, but the eccentrically-rotating journal is formed with a geometry imperfection (an axial groove) to continuously disrupt the elastohydrodynamic oil film and thus cause contact between the bearing and the shaft, leading to overloading of the bearing.

Bearings of diameter 53 mm, width 19 mm and bearing clearance 53 μm, formed from two semi-cylindrical bearing shells, were used in the tests. Two thermocouples positioned in the loaded half on either side of the bearing monitored bearing temperature in order to record scuffing and seizure events.

Figure 3:
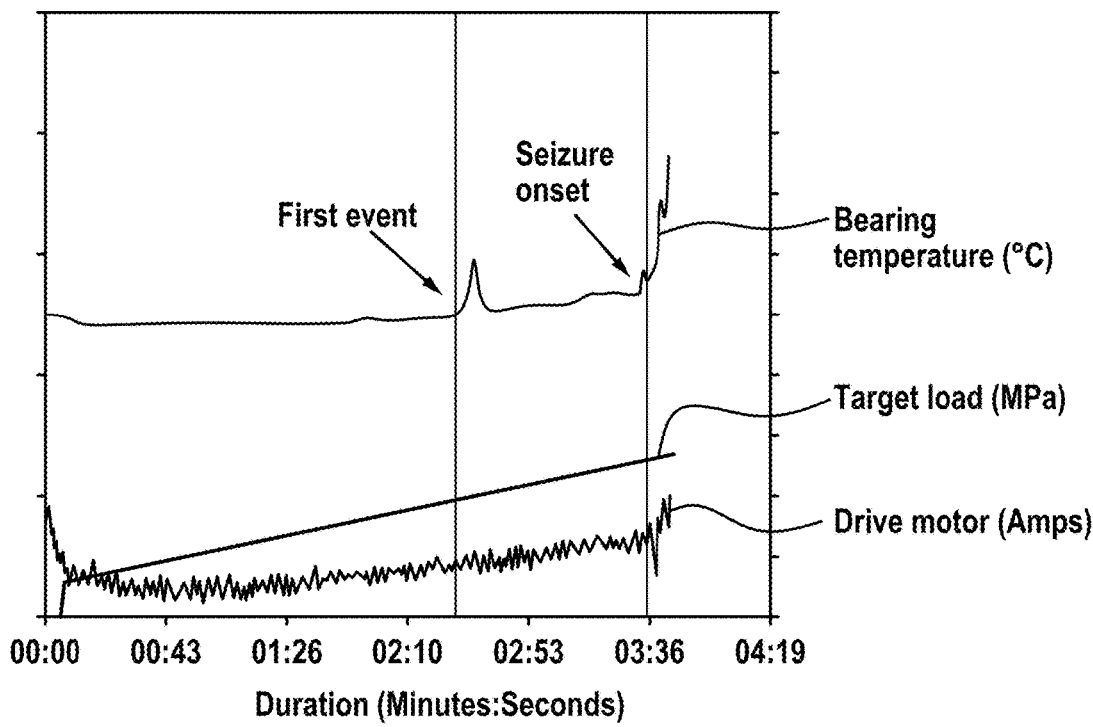
FIG. 3 is a graph of bearing temperature and applied load against time, during a test of a bearing embodying the invention.

FIG. 3 illustrates a typical test of a bearing embodying the invention. FIG. 3 is a graph showing traces for the bearing temperature, the load applied to the bearing, and the current drawn by the electric motor driving the shaft as measured during a test of a bearing. All of these parameters are plotted against time.

As the test progresses, a target load, or applied load, is applied to the bearing perpendicular to the eccentric shaft axis. The load is linearly increased with time until the bearing fails, to give a measure of bearing performance that allows different bearings to be compared.

The bearing temperature monitors degradation of the bearing. As shown in FIG. 3, after approximately 2 minutes 30 seconds, the bearing temperature rises (marked 'First Event' in FIG. 3) as a scuffing event occurs, when a portion of the overlay has been worn through. Importantly, however, the temperature then falls after the scuffing event, so that the bearing can continue to operate even though a portion of the interlayer may be exposed. As the applied load continues to increase, after about 3 minutes and 36 seconds, the bearing seizes (marked 'Seizure onset' in FIG. 3).

In a real application of the bearing, the delay between the initial scuffing event and the seizure of the bearing may advantageously allow a repair to be made before significant damage is caused.

The inventors have carried out tests to assess the performance advantage of bearings embodying the invention. These tests used the same testing procedure as described above with reference to FIG. 3, with an applied bearing load increasing with time until bearing failure. First, six bearings comprising a conventional nickel interlayer over a bronze lining were tested for reference. Six bearings according to a first embodiment of the invention were then tested. These were termed 'Variant A' and comprise a nickel interlayer electro-deposited (over a bronze lining) from a $NiSO_4$ electrolyte as described above, containing 10 g/l h-BN. Variant A achieved an average seizure load about 50% higher than the reference bearings. Six bearings according to a second embodiment, termed 'Variant B', were prepared in the same way as Variant A but the interlayer in Variant B was deposited from an electrolyte containing 20 g/l h-BN. Variant B achieved an average seizure load about 90% higher than the reference bearings.

In each of the bearings in these tests the thickness of the nickel-based layer were the same, as was the underlying bearing substrate.

Figure 4:
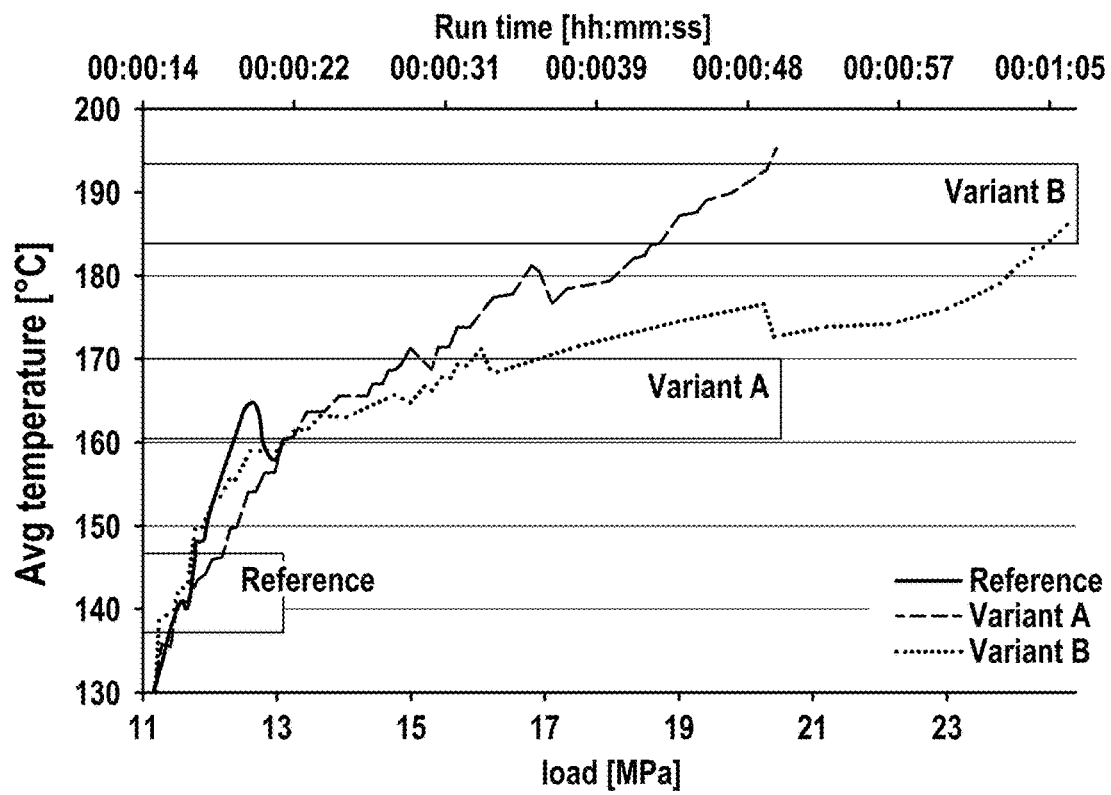
FIG. 4 is a graph of bearing temperature plotted against time, and linearly-increasing bearing load, during tests of three types of bearings.

FIG. 4 is a graph of bearing temperature against time for the bearing tests. The graph shows three traces. The solid line shows the average measured temperature for the six reference bearings. The dashed line shows the average measured temperature for the six Variant A bearings. The dotted line shows the average measured temperature for the six Variant B bearings. The applied bearing load increased linearly with time, as shown on the horizontal axis of the graph in FIG. 4.

As shown in FIG. 4, the Reference bearings failed after about 22 seconds, corresponding to an applied load of about 13 MPa, at a temperature of about 160° C. By contrast, the Variant A bearings failed after about 50 seconds, corresponding to an applied load of more than 20 MPa, surviving without bearing failure to a temperature of 195° C. The Variant B bearings failed after more than 1 minute, corresponding to an applied load of about 25 MPa, at a temperature of about 190° C.

Notably, the bearings of Variant A and Variant B not only achieved higher failure loads but also failed in a different way from the reference bearings. In all of the six tests of reference bearings, the tests were ended because an overload current was drawn by the drive motor driving the eccentric shaft. This implies an unacceptably high level of bearing friction, caused by bearing seizure.

By contrast, in the six tests of Variant A bearings and the six tests of Variant B bearings, all of the tests were ended because of an excessive rise in bearing temperature. Although this indicates bearing failure, it also indicates that the bearing friction did not reach the excessive level which occurred on failure of the reference bearings.

This probably indicates seizure caused by an increased level of microwelding on failure of the reference bearings, which is a more damaging failure mode than the increasing running temperature exhibited by the Variant A and Variant B bearings.

The invention claimed is:

1. A plain bearing comprising:
   a bearing substrate;
   a bearing overlay comprising Sn, a SnCu alloy, a SnZn alloy, a SnNi alloy, Bi or a Bi alloy; and
   an interlayer disposed between the bearing substrate and the bearing overlay, the interlayer composed of nickel incorporating a plurality of hexagonal boron nitride particles, wherein the interlayer has a thickness of between 3 μm and 7 μm and the plurality of hexagonal boron nitride particles have a diameter of less than 5 μm.

2. A plain bearing according to claim 1, wherein the plurality of hexagonal boron nitride particles are embedded within a thickness of the interlayer.

3. A plain bearing according to claim 1, wherein the plurality of hexagonal boron nitride particles have a diameter less than a thickness of the interlayer.

4. A plain bearing according to claim 1, wherein the diameter of the plurality of hexagonal boron nitride particles is less than 2 μm.

5. A plain bearing according to claim 1, wherein the interlayer is an electrolytically-deposited nickel layer.

6. A plain bearing according to claim 1, wherein the bearing overlay is lead-free.

7. A plain bearing according to claim 1, wherein the bearing overlay comprises a plurality of hard particles.

8. A plain bearing according to claim 1, wherein the bearing overlay comprises a plurality of hard particles, the plurality of hard particles comprising boron carbide.

9. A plain bearing according to claim 7, wherein the plurality of hard particles are contained in an amount of between 0.5 and 5 wt % of the bearing overlay.

10. A plain bearing according to claim 1, wherein the bearing overlay has a thickness of between 8 μm and 20 μm.

11. A plain bearing according to claim 1, wherein the bearing substrate comprises a bearing lining supported by a bearing backing, and the interlayer is defined on the bearing lining.

12. A plain bearing according to claim 11, wherein the bearing lining comprises Cu.

13. A plain bearing according to claim 1, wherein the bearing overlay comprises a tin-based material containing a plurality of hard particles in an amount of between 0.5 and 5 wt % of the bearing overlay, and wherein the plurality of hard particles include one or more of carbides, nitrides, and oxides.

14. A plain bearing comprising:
   a bearing substrate;
   a tin-based bearing overlay;
   an interlayer disposed between the bearing substrate and the bearing overlay, the interlayer composed of electro-deposited nickel and a plurality of hexagonal boron nitride particles embedded within a thickness of the electro-deposited nickel; and
   wherein the plurality of hexagonal boron nitride particles have a diameter of greater than 0.1 μm and less than 2 μm.

15. A plain bearing according to claim 14, wherein the tin-based overlay contains a plurality of hard particles in an amount of between 0.5 and 5 wt % of the tin-based bearing overlay.

16. A plain bearing according to claim 14, wherein the thickness of the interlayer is greater than 4 μm and less than 7 μm.

17. A plain bearing according to claim 14, further comprising a copper-based bearing lining layer disposed between the bearing substrate and the interlayer.

18. A plain bearing, comprising:
   a bearing substrate;
   a bearing overlay comprising Sn, a SnCu alloy, a SnZn alloy, a SnNi alloy, Bi or a Bi alloy; and
   an interlayer disposed between the bearing substrate and the bearing overlay, the interlayer consisting of electro-deposited nickel and a plurality of hexagonal boron nitride particles incorporated into the electro-deposited nickel, wherein the plurality of hexagonal boron nitride particles have a diameter of less than 5 μm.

* * * * *